Patented Apr. 23, 1929.

1,709,976

UNITED STATES PATENT OFFICE.

ALFRED GUENTHER, OF COLOGNE-RIEHL, ALFRED THAUSS, OF COLOGNE-DEUTZ, AND GUSTAV MAUTHE, OF COLOGNE-HOLWEIDE, GERMANY, ASSIGNORS TO GRASSELLI DYESTUFF CORPORATION, OF NEW YORK, N. Y., A CORPORATION OF DELAWARE.

SOLUTION FOR DYEING PURPOSES.

No Drawing. Application filed December 16, 1927, Serial No. 240,626, and in Germany December 17, 1926.

The present invention concerns the application of sulfonated-fatty acids derived from wool fat for the manufacture of stabilizing of solutions of $\beta$-hydroxy-naphthoic acid arylides.

In order to produce clear naphtholate solutions for the so-called naphthol AS dyeings from hyroxy-naphthoic acid arylides it is necessary to stir them to convert the same into a paste with Turkey red oil and similar wetting agents. Nevertheless the resulting solutions are frequently unstable and are precipitated, especially in the presence of calcareous water involving decomposition of the naphtholate, so that it is no longer usable for the dyeing process.

In accordance with the present invention the sulfonated fatty acids derived from wool fat essentially increase the stability of solutions of $\beta$-hydroxy-naphthoic acid arylides, even in the presence of calcareous water. Even difficultly soluble naphthols, such as $\beta$-hydroxy-naphthoic acid $\beta$-naphthalide can be easily brought into solution by means of such fatty acids, the solution also remaining clear for over 24 hours, while the solutions produced by means of Turkey red oil are precipitated after a short time and are thereby rendered useless. The usually prescribed employment of formaldehyde has also proved advantageous, since the solutions are more stable in the presence of formaldehyde.

Our invention is illustrated by the following example, but not restricted thereto:

*Example:* 5 grams of $\beta$-hydroxy-naphthoic acid $\beta$-naphthalide are made into a paste with from 1½ to twice the quantity of the sulfonated fatty acid derived from wool fat and a little hot water until a uniform magma is produced. 15 cc. of caustic soda solution of 34° Bé. and about ½ litre of hot water are then added thereto. The solution is boiled up until it is clear, diluted to 1 litre and on cooling 5 cc. of formaldehyde (40%) are added thereto.

We claim:
1. In the process of manufacture and stabilizing of solutions of $\beta$-hydroxy-naphthoic acid arylides, the step which comprises the application of a sulfonated fatty acid derived from wool fat.
2. In the process of manufacture and stabilizing of solutions of $\beta$-hydroxy-naphthoic acid arylides, the step which comprises the application of a sulfonated fatty acid derived from wool fat and formaldehyde.
3. The new stabilized solutions of $\beta$-hydroxy-naphthoic acid arylides containing a sulfonated fatty acid derived from wool fat.
4. The new stabilized solutions of $\beta$-hydroxy-naphthoic acid arylides containing a sulfonated fatty acid derived from wool fat and formaldehyde.
5. The new stabilized solution of $\beta$-hydroxy-naphthoic acid $\beta$-naphthalide containing a sulfonated fatty acid derived from wool fat and formaldehyde.

In testimony whereof we have hereunto set our hands.

ALFRED GUENTHER.
ALFRED THAUSS.
GUSTAV MAUTHE.